Figure 3:
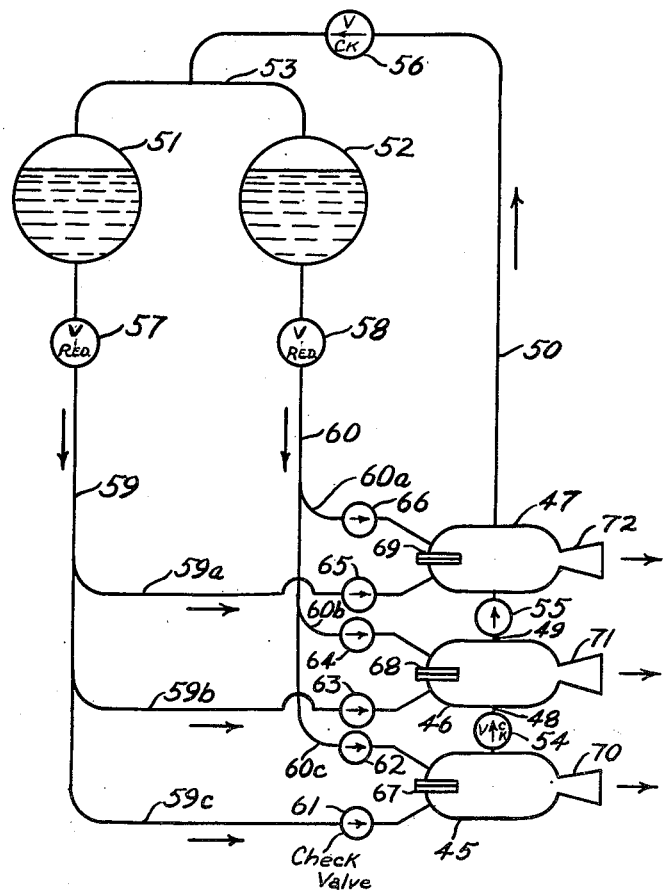

July 20, 1954     E. F. CHANDLER     2,683,963
REACTION ENGINE WITH AUTOMATIC PRESSURE REGULATION
Filed Aug. 5, 1947     2 Sheets-Sheet 1
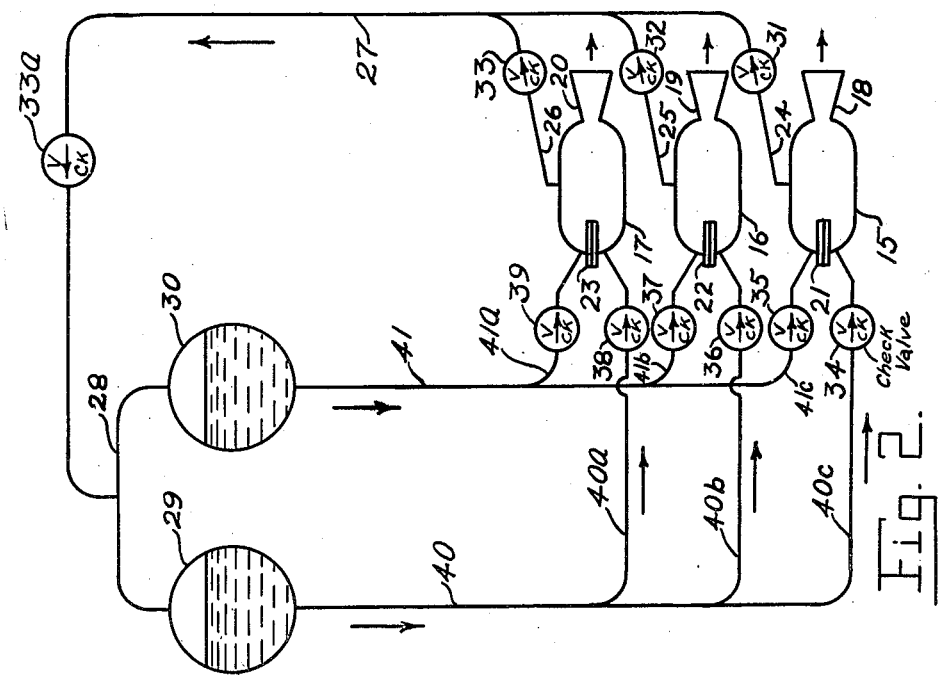
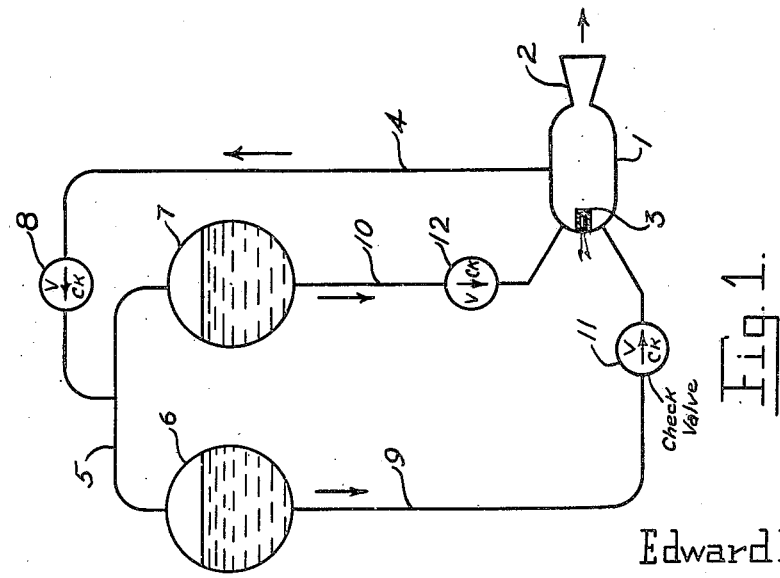
Inventor
Edward F. Chandler
By Peter Fries, Jr.
Attorney Patented July 20, 1954

2,683,963

UNITED STATES PATENT OFFICE 2,683,963

REACTION ENGINE WITH AUTOMATIC PRESSURE REGULATION

Edward F. Chandler, Brooklyn, N. Y.

Application August 5, 1947, Serial No. 766,241

2 Claims. (Cl. 60—35.6)

This invention relates to improvements in reaction motors and to reaction type power systems.

In rocket or propulsion jet motors it has been customary to supply the propellant fluid, such as gasoline or nitric acid, under pressure to the motor. The streams of the propellant injected into the combustion chamber of the motor were ignited by some heat source such as a common powder squib, electric heating coil, or the like. With combustion established, the products of combustion built up the pressure in the combustion chamber and were discharged through a nozzle to produce the thrust.

The nozzle and combustion chamber were usually jacketed and cooled by a liquid medium in order to provide smooth operation and longer life. A major problem has been that of supplying gas under pressure to the propellant fluid storage tanks to furnish the necessary fluid supply pressure to the motor. An auxiliary gas supply, as for example, compressed nitrogen, necessitated the use of high pressure containers of considerable weight and bulk, which is quite disadvantageous, particularly when space and weight are at a premium, such as in aircraft.

Accordingly, it is desirable to pressurize the fuel supply by means which do not add any appreciable weight to the system and do not take up any substantial amount of additional space. The present invention solves the problem by deriving the necessary gas pressure directly from the high pressure gases in the motor combustion chamber.

In addition, it is desirable to provide a reliable source of adequate heat for initiating combustion in the combustion chamber, and a solution to this problem is also presented herein. Further, it is desirable to provide adequate means for thoroughly atomizing and mixing the propellant fluids as they are injected into the combustion chamber for thorough and complete combustion thereof.

An object of the invention is to provide such means in a reaction motor for thoroughly atomizing and mixing the propellant fluids for assuring ignition thereof initially and during the operation of the motor, and at the same time furnishing a gas under sufficient pressure to the propellant supply tanks to force the propellant liquids into the combustion chamber of the motor.

Another object of the invention is to provide ignition means as aforesaid, which at the same time supplies adequate gas pressure, and in sufficient quantity, to pressurize the propellant fluid tanks, for the purpose of delivering the said fluids under pressure to the motor and for initially energizing the motor jet during the starting operation, as for example, during the launching of a jet propelled craft.

Means for adequately cooling the combustion chamber while simultaneously heating one or both propellant fluids, by passing one or both fluids in indirect heat-exchange relationship with the shell of the combustion chamber and/or the nozzle, are well known in the art and hence are not especially discussed herein, it being understood that such means may be employed.

Another important object of the invention is to provide a fully automatic reaction motor which is self-contained and not dependent upon a supply of gas stored under high pressure for starting or during the operation of the motor.

Still another object of the invention is to provide an improved reaction power system including means whereby, immediately upon ignition, the gas pressure within the combustion chamber is built up without time lag in order to provide a propulsive thrust, and in which the same high pressure gases formed in the combustion chamber are employed to pressurize the fuel supply tanks so as to force them continuously into the combustion chamber, the fuel constituents combining upon reaching the chamber and being ignited therein by contact with the high pressure high temperature gases to maintain the thrust and fuel pressurizing pressure.

A further object of the invention is to provide a reaction motor of the type described, which is further characterized by automatic feeding of fuel into the combustion chamber as needed to maintain pressure therein.

Still another object of the invention is to provide a reaction motor including a plurality of combustion chambers each with its individual gas discharge nozzle, all being supplied with fuel from storage tanks which are pressurized under the influence of high pressure gases derived from the combustion chambers, each chamber supplying high pressure gases directly into the fuel pressurizing system.

Another object of the invention is to provide a reaction motor system including a plurality of combustion chambers each having its individual gas discharge nozzle, all being supplied with fuel from storage tanks which are pressurized under the influence of high pressure gases derived from the combustion chambers, the chambers being connected together in series or concatenation, and one of said chambers being directly connected to the fuel pressurizing system.

Other objects and advantages of the invention will become apparent from the following description of preferred embodiments thereof, as illustrated in the accompanying drawings, and in which, Figure 1 is a diagrammatic illustration of a single jet reaction motor with fuel supply, Figure 2 is a diagrammatic illustration of a multi-jet reaction motor with fuel supply, and Figure 3 is a diagrammatic illustration of a modified design of multi-jet reaction motor.

In order to understand clearly the nature of the invention and the best means for carrying it out, reference may now be had to the drawings, which form a part of this application. In the form shown in Figure 1, there is a combustion chamber 1 equipped with a discharge nozzle 2, and means 3 for initially supplying heat and pressure within the combustion chamber.

The means 3 may preferably comprise a charge of suitable rocket propellant powder, or a relatively slow burning compound capable of evolving intense heat and a required quantity of gas under pressure when reacted. The said means 3 may be ignited or activated in any suitable manner as by a percussion cap, electric spark, hot wire, or otherwise.

Upon ignition of the pressure initiating means 3, the combustion chamber 1 is filled with the high pressure gases produced thereby, which leave the chamber through the discharge nozzle 2 to produce an immediate reactive thrust. At the same time, some of these high pressure gases produced in the combustion chamber are conveyed through pipe 4 and branch pipe 5 to the upper space above the liquids in tanks 6 and 7. A suitable check valve 8 prevents pressure flow back to the combustion chamber through pipe 4.

The fuel supply tanks 6 and 7 may contain a hydrocarbon liquid fuel and a liquid form of oxidizer respectively. When the gas pressure within the combustion chamber decreases below that of the pressure of the gas above the liquids in the tanks 6 and 7, principally due to discharge of gases through the nozzle 2, liquids will be forced from the tanks and delivered through pipes 9 and 10 in the directions shown by the arrows adjacent said pipes, into the combustion chamber 1, preferably in the form of an atomized spray which is intimately mixed and ignited as by the heat of the gases in the combustion chamber.

Suitable check valves 11 and 12 permit passage of the fluids toward the combustion chamber 1 only, through the pipes 9 and 10. From the above, it will be seen that the operation of the reaction motor may be briefly summarized as follows.

The operation of the motor is started by initially actuating the means 3, whereby the combustion chamber is pressurized. The nozzle 2 is energized by the high pressure gases to provide the required thrust, and, through the pipes 4 and 5, the fuel supply tanks 6 and 7 are pressurized. As the pressure in the combustion chamber decreases due to operation of the jet, liquid propellants are forced from the tanks 6 and 7 and into the reaction zone within the combustion chamber, thereby augmenting the combustion and the pressure therein, and thereby reducing the rate of feed of the propellant ingredients or components from the tanks. This effects automatic control of the reaction between predetermined minimum and maximum working limits.

In Figure 2, a plurality of combustion chambers are employed, as for example those shown at 15, 16 and 17, each having a jet forming nozzle as shown at 18, 19 and 20, respectively. Each combustion chamber is provided with means 21, 22 and 23 respectively, similar to that shown at 3 in Figure 1, for the purpose of initiating the reaction within the combustion chamber as already described, to produce high pressure gases therein.

Pressure develops within each of the combustion chambers 15, 16 and 17, part of the high pressure gas being bled off and delivered by pipes 24, 25 and 26 to the pipe 27 which, through the branch pipes 28, distributes the gas pressure to the upper part of the tanks 29 and 30, which may contain suitable liquid propellants or the ingredients or components thereof as already described for tanks 6 and 7 in Figure 1. Flow of gas pressure through pipe 27 is in the direction of the arrow shown adjacent thereto. Suitable check valves 31, 32 and 33, are interposed in pipes 24, 25 and 26 respectively, to prevent the backflow of the gas pressure toward the several combustion chambers. A master control check valve 33a may also be employed in pipe 27 as shown, if desired.

The liquid fuels in the tanks 29 and 30, which are thus pressurized from above, are forced out of the tanks and delivered to the combustion chambers by means of main fuel delivery pipes 40 and 41 respectively, in the direction of the arrows shown adjacent to the pipes, the fuel from pipe 40 being conducted to the separate chambers through branch pipes 40a, 40b and 40c. Suitable check valves 34, 36 and 38 are interposed in these branch pipes to prevent return flow through pipe 40.

The fuel from pipe 41 is similarly conducted to the separate combustion chambers through branch pipes 41a, 41b and 41c, respectively, return flow being prevented by means of check valves 35, 37 and 39 which are interposed in the branch pipes as shown.

The check valves 34, 35 and 36, and 37, 38 and 39 thus permit fluid from the tanks to be forced through pipes 40 and 41 in the direction of the arrows adjacent thereto when the pressure in said chambers decreases below that in the tanks, but prevents gases from any of the combustion chambers from flowing through these pipes in the reverse direction, toward the fuel supply tanks.

The operation of the multi-jet reaction motor may now be summarized. While all the combustion chambers may be placed in operation simultaneously by actuating the ignition and gas producing elements 21, 22 and 23, it is preferred to operate them in sequence, as for example, first chamber 15, then 16 and then 17, the cycle continuing thereafter. Thus, as the combustion chamber pressure is decreasing in one unit, it is building up in another and so on through the cycle embracing all the combustion chambers. This results in more uniform pressurization of the fuel tanks.

The reaction motor system shown in Figure 3 bears a certain degree of similarity to that shown in Figure 2, having substantially the same elements. However, it will be observed that the views differ in that Figure 3 shows the combustion chambers 45, 46 and 47 connected in series or concatenation by means of pipes 48 and 49, the pipe 50 being connected directly to the last combustion chamber 47 in the series as shown.

Pipe 50 conveys the cumulative pressure gases developed in the several combustion chambers to the upper part of the fuel supply tanks 51 and 52 which are similar to those shown in the other views and are filled with similar liquid fuel components as shown, connection with the tanks being effected through branch pipe 53. Suitable check valves 54, 55 and 56, interposed in the pipes 48, 49 and 50, respectively, prevent return flow of gases therethrough to the individual combustion chambers, the direction of gas pressure flow being indicated by the arrow adjacent pipe 50.

Suitable pressure reducing valves 57 and 58 control the pressure of the liquids being delivered to the combustion chambers from the tanks 51 and 52, through the main pipes 59 and 60 respectively, in which they are interposed. Fluid from tank 51 and pipe 59, flowing in the direction of the arrow adjacent the pipe, reaches the combustion chambers through branch pipes 59a, 59b and 59c respectively, in which are interposed check valves 61, 63 and 65 as shown.

Fluid from tank 52 and main pipe 60, flowing in the direction of the arrow adjacent the pipe, reaches the combustion chambers through branch pipes 60a, 60b and 60c, in which are interposed check valves 62, 64 and 66 as shown. The check valves 61, 62, 63, 64, 65, and 66 are so designed as to permit flow of liquid under pressure to the combustion chambers but to prevent the flow of gas pressure from the combustion chambers to the tanks through pipes 59 and 60.

In the operation of the device shown in Figure 3, initial ignition and gas pressure in the combustion chambers are similarly effected by actuation of the elements 67, 68 and 69, which are similar to those already described under numerals 3 and 21, 22 and 23 in the other views, the discharge of gas through the nozzles 70, 71 and 72 producing a reactive thrust. At the same time, part of the gas pressure is bled off through the pipes 48, 49 and 50 and conducted in the direction of the arrow adjacent pipe 50 in the view, to the fuel supply tanks 51 and 52 above the liquids, to pressurize the liquids therein, forcing them out of the tanks and into the pipes 59 and 60 from which they are fed into the individual combustion chambers automatically as the pressure drops therein. Automatic control of the combustion chamber pressure is thus effected.

An advantage of accumulating pressure in the tanks that is greater than the maximum pressure generated in any one of the jet-motor combustion chambers of Figure 3, resides in the possibility, by this means, to maintain a flow of fuel constituents to the combustion zone, even when the pressure in an individual jet-motor combustion chamber is at maximum.

The arrangement shown in Figure 1, where the pressure may be the same in both the tank and the combustion chamber under certain circumstances, may tend to "block" the feed of fuel constituents to the combustion zone, actually shutting off the feed, until the pressure in the combustion zone actually falls below that in the tank. Generally, however, it is expected that the "stop feed" period would be very brief and sufficient residual heat would be present to maintain and continue combustion and pressure discharge from the nozzle.

In other words, the pressure loss in the combustion chamber due to the jet can be relatively rapid, so that feed will probably never actually cease but would be cut back, more or less, depending upon a number of operating factors. It is contemplated that the "mean pressure" at the nozzle would remain relatively constant, irrespective of pressure variations between a maximum and minimum range within the system.

Although I have described my invention in specific terms, it is to be understood that various changes may be made in size, shape, materials and arrangement without departing from the spirit and scope of the invention as claimed.

I claim:

1. A reaction power device comprising a plurality of liquid fuel component tanks each adapted to contain a separate fuel component and forming upon admixture, a reaction power fuel, a plurality of individual combustion chambers having discharge nozzles forming outlets therefrom to produce a reactive thrust, delivery pipes connecting each combustion chamber with all of said fuel component tanks to receive liquid therefrom for admixture within the combustion chamber, valves interposed in said delivery pipes for regulating the direction and rate of flow therethrough, initial gas producing means including ignitable powder in each combustion chamber which when actuated produces high pressure high temperature gases therein sufficient to instantaneously produce a reactive thrust of predetermined magnitude through said nozzles, means for actuating said initial gas producing means, gas pressure ducts interconnecting all of said combustion chambers, gas pressurizing bleeder conduit means connecting at least one of said combustion chambers with the interiors of said liquid fuel component tanks above the liquid level therein, for pressurizing the same, and valve means interposed in the bleeder conduit means for regulating the direction and magnitude of gas pressure flow, whereby, upon initiation of the cycle said initial gas producing means simultaneously and without substantial time lag both produces a reactive thrust through said nozzles and pressurizes the fuel component tanks, and whereby, upon a predetermined reduction of gas pressure in the combustion chamber, said fuel components are automatically fed into the combustion chamber to maintain said gas pressure within predetermined limits.

2. The method of operating a reaction motor having a reaction chamber equipped with a power jet nozzle, which consists in employing pressure developed within the chamber for feeding liquid propellants into the said chamber, reacting the said propellants therein to augment said pressure, and utilizing the pressure for energizing the power jet nozzle and for feeding the propellants into the reaction chamber in increasing or decreasing quantity as the pressure from the reaction in said chamber decreases or increases relative to the pressure energizing the said power jet.

References Cited in the file of this patent

UNITED STATES PATENTS

| Number | Name | Date |
|---|---|---|
| 2,408,111 | Truax et al. | Sept. 24, 1946 |
| 2,447,758 | Lubbock et al. | Aug. 24, 1948 |
| 2,505,798 | Skinner | May 2, 1950 |
| 2,531,761 | Zucrow | Nov. 28, 1950 |

OTHER REFERENCES

"Astronautics," No. 34, June 1936, pages 9 and 11.